(12) United States Patent
Shimada

(10) Patent No.: US 10,440,312 B2
(45) Date of Patent: Oct. 8, 2019

(54) IMAGE PICKUP APPARATUS, AND IMAGE PROCESSING METHOD FOR PERFORMING COMPARISON LIGHT COMPOSITION OF IMAGE DATA

(71) Applicant: OLYMPUS CORPORATION, Hachioji-shi, Tokyo (JP)

(72) Inventor: Yoshinao Shimada, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 168 days.

(21) Appl. No.: 15/288,426

(22) Filed: Oct. 7, 2016

(65) Prior Publication Data

US 2017/0111607 A1      Apr. 20, 2017

(30) Foreign Application Priority Data

Oct. 14, 2015      (JP) ................................ 2015-203001

(51) Int. Cl.
*H04N 5/217*      (2011.01)
*H04N 5/911*      (2006.01)
(Continued)

(52) U.S. Cl.
CPC ............. *H04N 5/911* (2013.01); *H04N 5/357* (2013.01); *H04N 5/361* (2013.01); *H04N 5/772* (2013.01); *H04N 9/045* (2013.01)

(58) Field of Classification Search
CPC ........ H04N 5/217; H04N 5/357; H04N 5/911; H04N 5/232; H04N 5/265; H04N 5/361;
(Continued)

(56) References Cited

U.S. PATENT DOCUMENTS

2005/0099505 A1*   5/2005   Suzuki ................... H04N 5/361
                                                            348/222.1
2013/0016252 A1*   1/2013   Yoshida ................. H04N 5/361
                                                            348/239
(Continued)

FOREIGN PATENT DOCUMENTS

JP        2013-240029 A      11/2013
JP        2015-035717 A       2/2015

OTHER PUBLICATIONS

Office Action issued in corresponding Japanese Patent Application No. 2015-203001 dated Aug. 6, 2019, consisting of 6 pp.

*Primary Examiner* — Sinh Tran
*Assistant Examiner* — Selam T Gebriel
(74) *Attorney, Agent, or Firm* — Volpe and Koenig, P.C.

(57) ABSTRACT

An image pickup apparatus includes a comparison light composition section that composes a comparison light image from image data of a plurality of frames, a number-of-replacement-target-frames calculating section for performing, on the comparison light image, for each of partial regions, at least one of deviation correction for a black level attributable to dark random noise with respect to black level subtraction processing of an OB-value subtracting section and correction for deviation of a pixel value attributable to light random noise by a pixel-gain correcting section, a dark-random-noise-tendency determining section, and a light-random-noise-correction-amount calculating section.

4 Claims, 10 Drawing Sheets

(51) Int. Cl.
 *H04N 5/357* (2011.01)
 *H04N 5/77* (2006.01)
 *H04N 5/361* (2011.01)
 *H04N 9/04* (2006.01)

(58) Field of Classification Search
 CPC ...... H04N 5/376; H04N 5/3658; H04N 5/363; H04N 5/913; H04N 9/7908; H04N 5/932; H04N 21/234354; G06K 9/46; G06K 9/62; G06T 5/002; G06T 2207/20182
 See application file for complete search history.

(56) References Cited

U.S. PATENT DOCUMENTS

| | | |
|---|---|---|
| 2015/0042849 A1 | 2/2015 | Negishi |
| 2016/0182840 A1* | 6/2016 | Iwasaki ................. H04N 5/365 348/243 |

\* cited by examiner

| GAIN SETTING [dB] | 24 |
|---|---|
| CONVERSION COEFFICIENT [LSB/e] | 3.04 |

IMAGE PICKUP APPARATUS, AND IMAGE PROCESSING METHOD FOR PERFORMING COMPARISON LIGHT COMPOSITION OF IMAGE DATA

CROSS REFERENCE TO RELATED APPLICATION

This application claims benefit of Japanese Application No. 2015-203001 filed in Japan on Oct. 14, 2015, the entire contents of which are incorporated herein by this reference.

BACKGROUND OF THE INVENTION

1. Field of the Invention

The present invention relates to an image pickup apparatus, an image processing apparatus, and an image processing method that perform comparison light composition of image data of a plurality of frames picked up in time series.

2. Description of the Related Art

In recent years, there has been proposed an image pickup apparatus such as a digital camera implemented with a comparison light composition processing function. The comparison light composition processing is processing for comparing pixel values in the same pixel position in images of a plurality of frames picked up in time series and replacing a pixel value in the pixel position with a pixel value having a larger value.

The comparison light composition processing is used for images of a plurality of frames obtained by picking up images in time series (so-called continuous photographing) at necessary and sufficient short fixed shutter speed (therefore, the shutter speed is common to the respective images) in a photographing scene including a relatively light and small moving body. The comparison light composition processing can acquire a track of the moving object as a satisfactory image having a high SN ratio.

Several examples of photographing scenes to which the comparison light composition processing is applied include fireworks, celestial photographing, and photographing of a moving track of a headlight of a car or the like at night.

For example, in the case of the firework photographing, images of flows in several seconds of light spots forming fireworks are picked up in time series at shutter speed shorter than the several seconds to acquire images of a plurality of frames. In the case of the celestial photographing, images of extremely slow movements of stars forming a celestial body are picked up in time series at short shutter speed to acquire images of a plurality of frames. Further, in the case of the moving track of the headlight of the car or the like at night, similarly, images of the moving track are picked up in time series at shutter speed shorter than shutter speed corresponding to the length of the moving track to be photographed to obtain images of a plurality of frames.

In all the cases, by performing comparison light composition of the obtained images of the plurality of frames, it is possible to avoid image quality deterioration due to a dark current as in the case of photographing at shutter speed for a long time and obtain an image having a high SN.

Incidentally, image noise is classified into fixed pattern noise attributable to a characteristic of each of pixels and random noise not having a correlation with a pixel position. The random noise is roughly classified into dark random noise that occurs irrespectively of a signal generated by photoelectric conversion according to incident light in a pixel (therefore, occurs even in a light-blocked state) and light random noise that occurs according to the signal generated by the photoelectric conversion (therefore, does not occur in the light-blocked state).

A magnitude relation of the dark random noise and the light random noise depends on an electric gain through exposure control of a camera. More specifically, when an amplification amount by the electric gain is small (when an exposure amount is large and there is little necessity of amplification), the light random noise increases and becomes predominant because a pixel value obtained by photoelectrical conversion in the respective pixels is relatively large. When the amplification amount is large (when the exposure amount is small and there is necessity of amplification), the light random noise decreases and the dark random noise becomes predominant because the pixel value obtained by the photographic conversion in the respective pixels is relatively small.

The dark random noise occurs, for example, as noise attributable to a dark current of a photodiode of a pixel or as circuit noise. The dark random noise is not only included in a pixel value obtained from an effective pixel but also included in an OB component obtained from an optical black (OB) region optically shielded from light on an image pickup surface of an image pickup device. The OB component neither includes a signal generated by photoelectrically converting incident light nor includes the light random noise. Therefore, it is possible to more easily and more accurately detect the dark random noise when the OB component is used than when the pixel value obtained from the effective pixel is used.

A value of the dark random noise fluctuates for each of frames at random. When the comparison light composition processing is performed, one comparison light image adopting a largest pixel value in a plurality of frames obtained by photographing is generated. However, since a pixel value including largest random noise is highly likely to be a largest pixel value, as the number of frames is larger, the pixel value is replaced with a larger value affected by larger random noise.

On the other hand, if the comparison light composition processing is performed on the OB component obtained from the OB region in the same manner as for the effective pixel region, a pixel value having magnitude corresponding to the magnitude of the number of frames is adopted. Therefore, by subtracting the OB component subjected to the comparison light composition processing from a comparison light image of the effective pixel region, it is possible to effectively cancel the influence of the random noise.

For example, Japanese Patent Application Laid-Open Publication No. 2013-240029 describes a technique for, in digital clamp processing for removing an offset component from a composed image, controlling a digital clamp amount on the basis of the number of composed photographed images to cope with fluctuation in a black level corresponding to the number of composed images in image composition such as comparison light composition and comparison dark composition by a RAW image and suppress image quality deterioration of the composed image. The publication further mentions that the digital clamp amount is controlled according to at least one of photographing sensitivity, a white balance, an exposure time, a correction amount of a peripheral light amount, and an environmental temperature.

SUMMARY OF THE INVENTION

An image pickup apparatus according to a certain aspect of the present invention includes: an image pickup section that picks up an image of an object and acquires image data; a control section that causes the image pickup section to perform image pickup in time series and acquires image data of a plurality of frames; a comparison light composition section that replaces, on the basis of the image data of the plurality of frames, for each of pixels corresponding to the image data, a pixel value of one of the pixels with a pixel value of a lighter pixel and composes a comparison light image; and a correcting section that performs, on the comparison light image, for each partial region formed by one or more pixels, at least one of correction for black level subtraction processing by correction of deviation of a black level attributable to dark random noise and correction for deviation of a pixel value attributable to light random noise.

An image processing apparatus according to a certain aspect of the present invention includes: a comparison light composition section that replaces, on the basis of image data of a plurality of frames acquired by picking up images of an object in time series, for each of pixels corresponding to the image data, a pixel value of one of the pixels with a pixel value of a lighter pixel and composes a comparison light image; and a correcting section that performs, on the comparison light image, for each partial region formed by one or more pixels, at least one of correction for black level subtraction processing by correction of deviation of a black level attributable to dark random noise and correction for deviation of a pixel value attributable to light random noise.

An image processing method according to a certain aspect of the present invention includes: a comparison light composition step for replacing, on the basis of image data of a plurality of frames acquired by picking up images of an object in time series, for each of pixels corresponding to the image data, a pixel value of one of the pixels with a pixel value of a lighter pixel and composing a comparison light image; and a correcting step for performing, on the comparison light image, for each partial region formed by one or more pixels, at least one of correction for black level subtraction processing by correction of deviation of a black level attributable to dark random noise and correction for deviation of a pixel value attributable to light random noise.

DETAILED DESCRIPTION OF THE PREFERRED EMBODIMENT

An embodiment of the present invention is explained below with reference to the drawings.

First Embodiment

Figure 1:
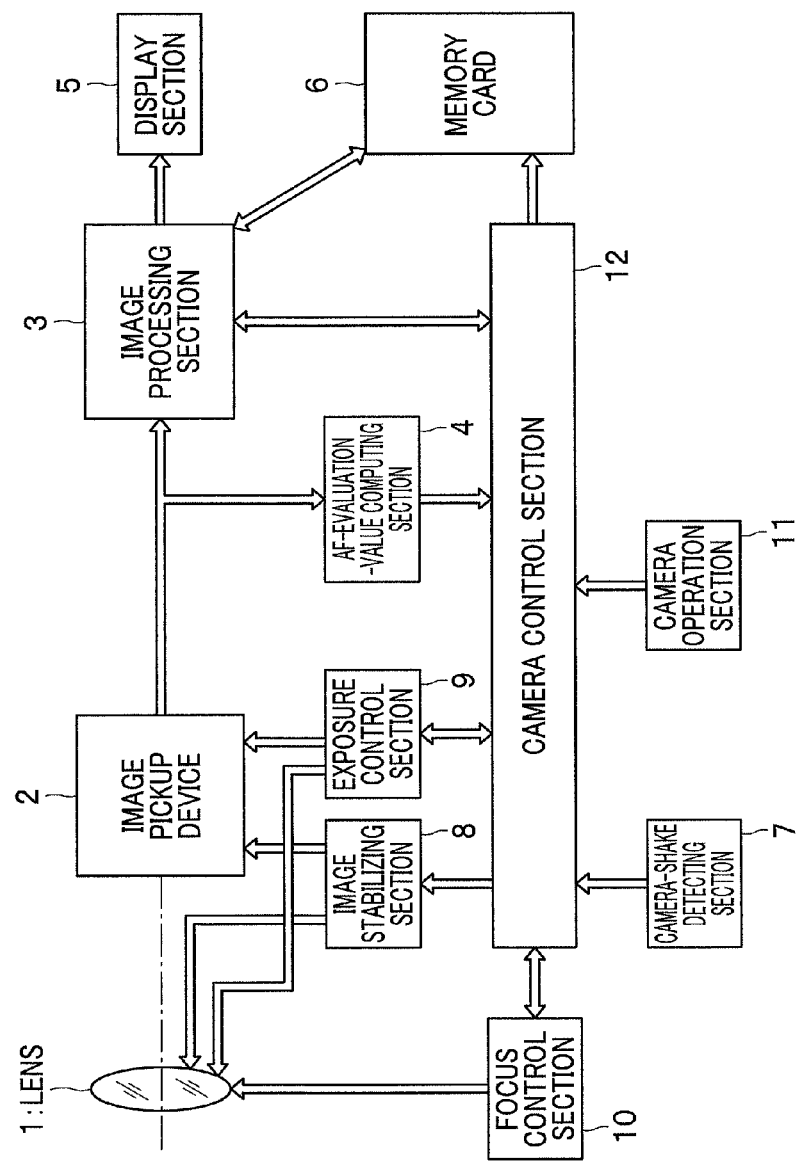
FIG. 1 is a block diagram showing a configuration of an image pickup apparatus in a first embodiment of the present invention.

FIG. 1 to FIG. 14 show a first embodiment of the present invention. FIG. 1 is a block diagram showing a configuration of an image pickup apparatus. The image pickup apparatus in the present embodiment includes a function of an image processing apparatus that processes an image obtained by performing image pickup as explained below.

The image pickup apparatus includes, as shown in FIG. 1, a lens 1, an image pickup device 2, an image processing section 3, an AF (autofocus)-evaluation-value computing section 4, a display section 5, a camera-shake detecting section 7, an image stabilizing section 8, an exposure control section 9, a focus control section 10, a camera operation section 11, and a camera control section 12. Note that a memory card 6 is also shown in FIG. 1. However, since the memory card 6 is configured to be detachably attachable to the image pickup apparatus, the memory card 6 does not have to be a component peculiar to the image pickup apparatus.

The lens 1 is an image pickup optical system that forms an optical image of an object in an image pickup region of the image pickup device 2. The lens 1 includes a focus lens for adjusting a focal position (a focus position) and performing focusing and a diaphragm for controlling a range of a light beam passing through the lens 1. Further, in the present embodiment, the lens 1 includes an image stabilizing function as well.

The image pickup device 2 is an image pickup section that photoelectrically converts the optical image of the object formed by the lens 1, performs image pickup, and acquires and outputs image data. Note that, in the present embodiment, the image pickup device 2 is explained as a color image pickup device including a color filter of a primary-color Bayer array. However, naturally, the image pickup device 2 may have other configurations. The image pickup device 2 is configured to be movable within a surface perpendicular to a photographing optical axis of the lens 1. The image pickup device 2 includes an image stabilizing function. Further, in the present embodiment, an example is explained in which the image pickup device 2 is a digital image pickup device, performs A/D conversion on an inside, and outputs, for example, a digital signal of 12 bits (pixel values 0 to 4095).

The image processing section 3 is an image processing device that performs various kinds of image processing on the image data outputted from the image pickup device 2 and creates an image for display or for recording. The image processing section 3 also performs comparison light composition processing. A configuration of the image processing section 3 is explained in detail below with reference to FIG. 4.

The AF-evaluation-value computing section 4 calculates an AF evaluation value on the basis of the image data outputted from the image pickup device 2 and outputs the AF evaluation value to the camera control section 12. For example, the AF-evaluation-value computing section 4 calculates a contrast value on the basis of the image data outputted from the image pickup device 2 and outputs the contrast value as the AF evaluation value.

The display section 5 displays an image on the basis of a signal subjected to the image processing for display by the image processing section 3. The display section 5 performs live view display, still image display, moving image reproduction display, and the like and also displays various kinds of information and the like related to the image pickup apparatus.

The memory card 6 is a recording medium for storing image data (still image data, movie data, and the like) processed for recording by the image processing section 3.

The camera-shake detecting section 7 includes an acceleration sensor and an angular velocity sensor. The camera-shake detecting section 7 detects a camera shake of the image pickup apparatus and outputs the camera shake to the camera control section 12.

The image stabilizing section 8 moves, on the basis of control by the camera control section 12, at least one of the lens 1 and the image pickup device 2 to offset the detected camera shake and reduces influence of the camera shake on an optical object image formed on the image pickup region of the image pickup device 2.

The exposure control section 9 controls, on the basis of a command of the camera control section 12, a device shutter of the image pickup device 2 at shutter speed (an exposure time) determined by the camera control section 12 to acquire an image. Further, the exposure control section 9 also performs, for example, control of the diaphragm included in the lens 1 on the basis of a diaphragm value determined by the camera control section 12. The exposure control section 9 outputs driving information of the image pickup device 2 to the camera control section 12.

The focus control section 10 drives the lens 1 in order to adjust a focus. That is, the focus control section 10 drives the focus lens included in the lens 1 on the basis of the control by the camera control section 12, which receives the AF evaluation value from the AF-evaluation-value computing section 4, to focus the object image formed by the image pickup device 2. The focus control section 10 outputs lens driving information such as a lens position to the camera control section 12.

The camera operation section 11 is an operation section for performing various operation inputs to the image pickup apparatus. The camera operation section 11 includes operation members such as a power switch for turning on and off a power supply of the image pickup apparatus, a release button for inputting instructions for still image photographing, moving image photographing, and the like, and a mode button for setting a still image photographing mode (the still image photographing mode includes a comparison light composition mode as a more detailed mode), a moving image photographing mode, a live view mode, and the like.

The camera control section 12 controls the entire image pickup apparatus including the image processing section 3, the memory card 6, the image stabilizing section 8, the exposure control section 9, and the focus control section 10 on the basis of the lens driving information from the focus control section 10, the AF evaluation value from the AF-evaluation-value computing section 4, the driving information from the exposure control section 9, the processing information from the image processing section 3, the camera shake information from the camera-shake detecting section 7, the operation input from the camera operation section 11, and the like.

The camera control section 12 determines shutter speed (an exposure time) and a diaphragm value on the basis of automatic exposure control or on the basis of the set value inputted from the camera operation section 11 and outputs the determined shutter speed and the determined diaphragm value to the exposure control section 9.

When the comparison light composition mode is set, the camera control section 12 functions as a control section that causes, via the exposure control section 9, the image pickup device 2 to perform image pickup in time series and acquires image data of a plurality of frames.

Figures 2, 3:
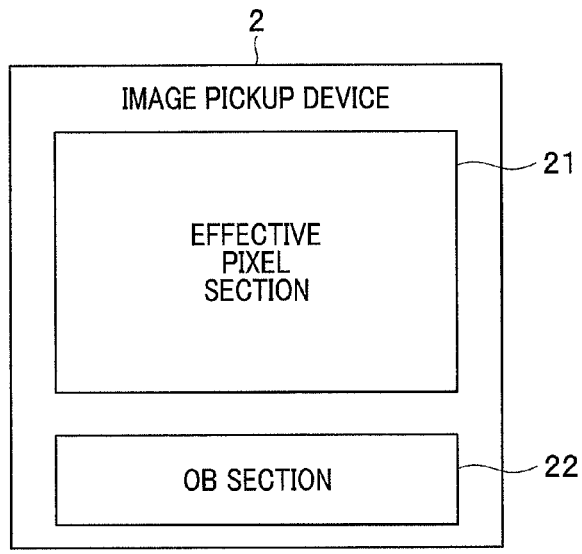
FIG. 2 is a diagram showing a configuration of an image pickup device in the first embodiment.
FIG. 3 is a diagram showing an array of pixels in an effective pixel section of the image pickup device in the first embodiment.

FIG. 2 is a diagram showing a configuration of the image pickup device 2. The image pickup device 2 includes an effective pixel section 21 in which pixels that receive light from the lens and perform photoelectric conversion are arrayed in a vertical direction and a horizontal direction and an OB section 22, which is an optical black region in which pixels shielded from light from the lens 1 are arrayed. The OB section 22 is provided as a vertical OB region, a horizontal OB region, or the like, for example, in an upper part, a left part, or the like of the effective pixel section 21.

FIG. 3 is a diagram showing an array of pixels in the effective pixel section 21 of the image pickup device 2.

In the effective pixel section 21 of the image pickup device 2, as shown in FIG. 3, a color filter of a primary-color Bayer array is disposed. In the primary-color Bayer array, as it is well known, with a 2×2 pixel array set as a basic array, green pixels Gr and Gb are disposed in diagonal positions of the basic array, a red pixel R is disposed on a line same as a line of the green pixel Gr, and a blue pixel B is disposed on a line same as a line of the green pixel Gb.

Note that the color filter of the primary-color Bayer array is not limited to be disposed in the effective pixel section 21 and may be disposed on an entire image pickup surface of the image pickup device 2 including the OB section 22.

Figure 4:
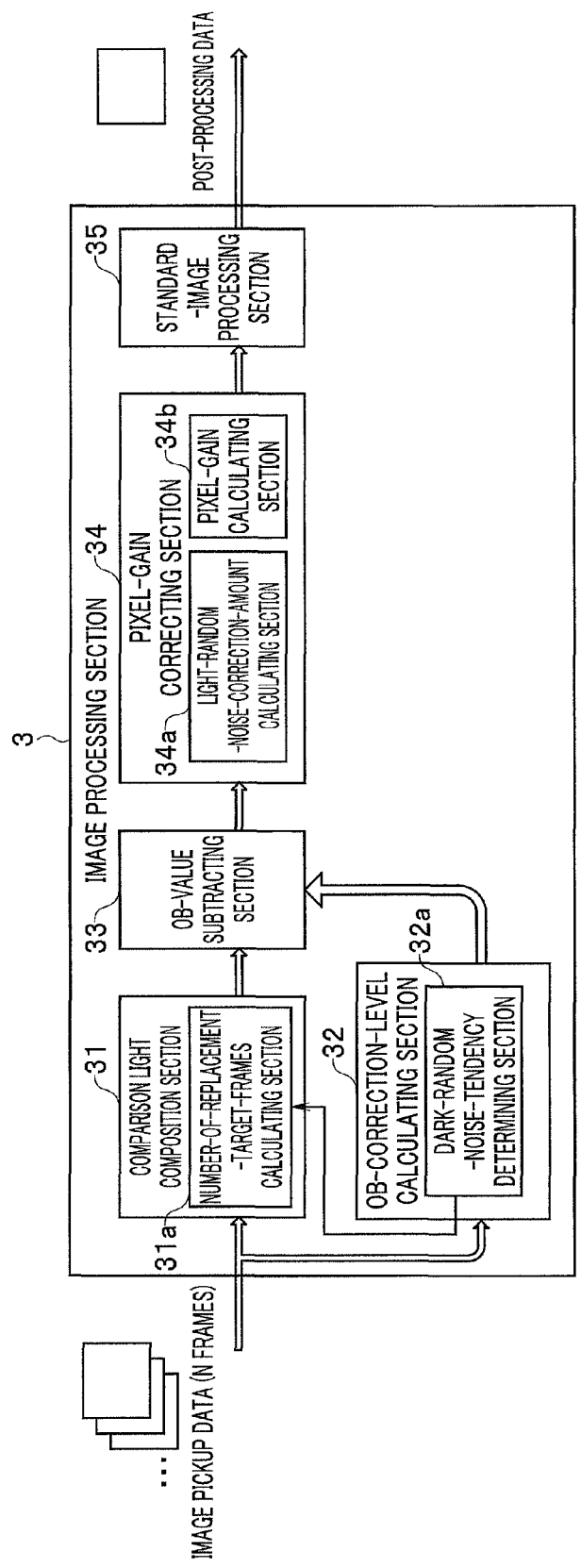
FIG. 4 is a block diagram showing a configuration of an image processing section in the first embodiment.

FIG. 4 is a block diagram showing the configuration of the image processing section 3.

The image processing section 3, which is an image composing section, includes a comparison light composition section 31, an OB-correction-level calculating section 32, an OB-value subtracting section 33, a pixel-gain correcting section 34, and a standard-image processing section 35.

The comparison light composition section 31 performs, on the basis of the control by the camera control section 12, on image data of a plurality of frames acquired from the effective pixel section 21 of the image pickup device 2 in the comparison light composition mode, for each of pixels corresponding to the image data, comparison light composition processing for replacing a pixel value of the pixel with a pixel value of a lighter pixel and creates a comparison light image. Further, the comparison light composition section 31 performs the comparison light composition processing on a pixel value acquired from the OB section 22 according to necessity.

Pixel values of respective pixels of the comparison light image include true pixel values obtained by photoelectric conversion when photons of the number of photons of an average value (obtained by removing influence of light shot noise) from an object are made incident on the pixels and noise other than the true pixel values. In the present embodiment, as noise that occurs in each of the pixels, influence of the random noise including the light random noise and the dark random noise explained below is considered.

The comparison light composition section 31 includes a number-of-replacement-target-frames calculating section 31a. As explained below with reference to FIG. 6, the number-of-replacement-target-frames calculating section 31a counts, with respect to respective pixels i (i is an index for distinguishing pixels of an image obtained from the effective pixel section 21 according to pixel positions), the number of replacement target frames n[i], which is the number of frames effective as targets for which the comparison light composition section 31 replaces pixel values.

As an example, even when images of one hundred frames are picked up for comparison light composition, if a moving object lighter than a background in a certain pixel position is present only for fifty frames, the fifty frames are the number of frames effective as targets for which pixel values are replaced.

The influence of the random noise tends to increase according to an actual number of times of replacement of pixel values in the comparison light composition processing. However, accurately, the influence of the random noise may be considered to increase involving probabilistic action according to an increase in the number of replacement target frames n[i]. In the present embodiment, as a parameter for calculating an OB correction level Cob[i] representing influence of the dark random noise and a light random noise correction amount Sft_P[i] representing influence of the light random noise explained below, the number of replacement target frames n[i] is counted (an actual number of times of replacement may be counted for each of the pixels i).

The number of replacement target frames n[i] obtained here is used for determining, as explained below, a correction amount for black level subtraction processing by correcting deviation of a black level attributable to the dark random noise and a correction amount for correcting deviation of a pixel value attributable to the light random noise.

The OB-correction-level calculating section 32 includes a dark-random-noise-tendency determining section 32a. The dark-random-noise-tendency determining section 32a calculates, for example, an average of the standard deviation σd indicating a degree of variation of a pixel value attributable to the dark random noise among a plurality of frames of respective pixel values of the OB section 22.

The OB-correction-level calculating section 32 calculates the OB correction level Cob[i] for respective pixel positions of the effective pixel section 21 on the basis of the standard deviation σd and the number of replacement target frames n[i] calculated by the number-of-replacement-target-frames calculating section 31a. The OB correction level Cob[i] is a black level correction amount for correcting influence in the dark random noise included in a black level of a pixel i.

The OB-value subtracting section 33 calculates, as a black level of any pixel i, an average <OB> (e.g., an average of a pixel value shown in FIG. 9) of the OB section 22 in any one frame in picked-up image data of a plurality of frames obtained for comparison light composition. Further, the OB-value subtracting section 33 corrects the calculated average <OB> with the OB correction level Cob[i] for each of the pixels i calculated by the OB-correction-level calculating section 32 and calculates an OB value OB[i] serving as a corrected black level for each of the pixels i. Thereafter, the OB-value subtracting section 33 performs, as black level subtraction processing, processing for subtracting the OB value OB[i] from a pixel value PeakP[i] of the pixel i in the comparison light image.

The pixel-gain correcting section 34 performs correction for deviation of a pixel value attributable to the light random noise. The pixel-gain correcting section 34 includes a light-random-noise-correction-amount calculating section 34a and a pixel-gain calculating section 34b.

The light-random-noise-correction-amount calculating section 34a estimates a light random noise amount σb[i] on the basis of an average pixel value (Pave[i] explained below) of the pixel i in a result obtained by performing processing concerning all images (images of N frames explained below) acquired as targets of the comparison light composition. The light-random-noise-correction-amount calculating section 34a calculates, according to the estimated light random noise amount σb[i] and the standard deviation σd, a light random noise amount Sft_P[i] that depends on the number of replacement target frames n[i]. The light random noise correction amount Sft_P[i] is a correction amount for the deviation of the pixel value attributable to the light random noise.

The pixel-gain calculating section 34b calculates, for the respective pixel positions, a gain PG_P[i] corresponding to whether the pixel i is an R pixel, a G (Gr and Gb) pixel or a B pixel using the light random noise correction amount Sft_P[i].

In this way, the pixel-gain correcting section 34 performs correction for deviation of the pixel value of the pixel i attributable to the light random noise as, for example, gain correction using the gain PG_P[i] calculated for the pixel i.

The number-of-replacement-target-frames calculating section 31a, the OB-correction-level calculating section 32, the OB-value subtracting section 33, and the pixel-gain correcting section 34 configure a correcting section that performs, on the comparison light image, for each partial region formed by one or more pixels, at least one of correction for black level subtraction processing by correction of deviation of a black level attributable to the dark random noise and correction for deviation of a pixel value attributable to the light random noise.

In the present embodiment, it is assumed that a partial region is formed by one pixel. However, processing may be performed for each partial region formed by a plurality of pixels (e.g., a partial region formed by a plurality of pixels having substantially the same pixel values). In general, an optical image of a certain object is formed over a plurality of pixels. Therefore, by performing the processing for each partial region formed by the plurality of pixels, it is possible to further reduce a processing amount than when processing concerning all pixels is performed. There is an advantage that a processing load is reduced and high-speed processing can be performed.

The standard-image processing section 35 performs, on the comparison light image created and corrected as explained above by the comparison light composition section 31 to the pixel-gain correcting section 34 (or an image obtained by a normal photographing mode), standard image processing for creating an image for display or an image for recording, so-called development processing. The standard image processing includes, for example, demosaicking processing, white balance correction, color matrix processing, and gamma conversion processing.

Figure 5:
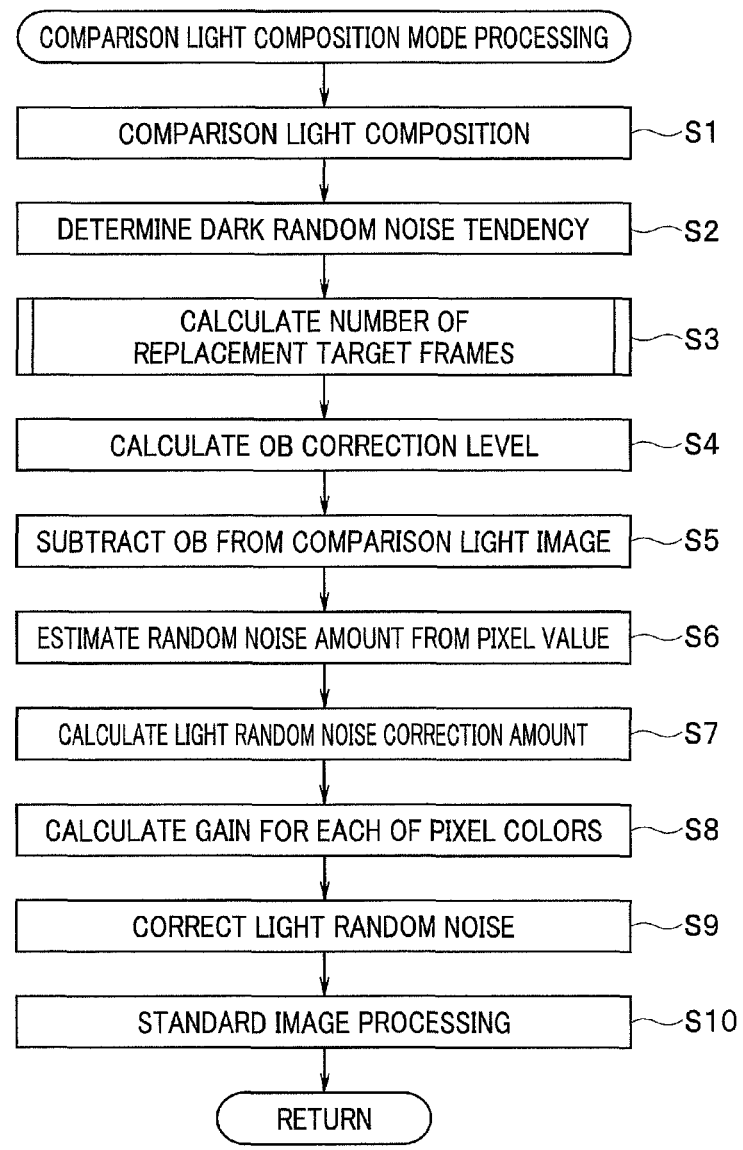
FIG. 5 is a flowchart showing comparison light composition mode processing performed by the image processing section in the first embodiment.

FIG. 5 is a flowchart showing the comparison light composition mode processing performed by the image processing section 3. Note that, when the comparison light composition mode is set, it is assumed that, before the processing is started, image pickup processing is performed on the basis of the control by the camera control section 12 and image data of a plurality of frames (N frames) is acquired by the image pickup device 2 and stored in a not-shown internal memory. However, processing by the image processing section 3 is not limited to this. For example, processing executable in parallel to an image pickup operation may be performed in parallel to the image pickup operation.

When the processing is started by the not-shown main processing entering the processing, the image processing section 3 performs the comparison light composition processing with the comparison light composition section 31 and creates a comparison light image (step S1). The comparison light image is an image formed by a maximum pixel value PeakP[i] among pixel values P[i] of the pixel i (when the pixel i is an R pixel, P=R (a pixel value R[i]), when the pixel i is a G pixel, P=G (a pixel value G[i]), and, when the pixel i is a B pixel, P=B (a pixel value B[i])) in respective images of a first frame to an N-th frame.

Subsequently, the dark-random-noise-tendency determining section 32a performs determination of dark random noise tendency (step S2).

Figure 7:
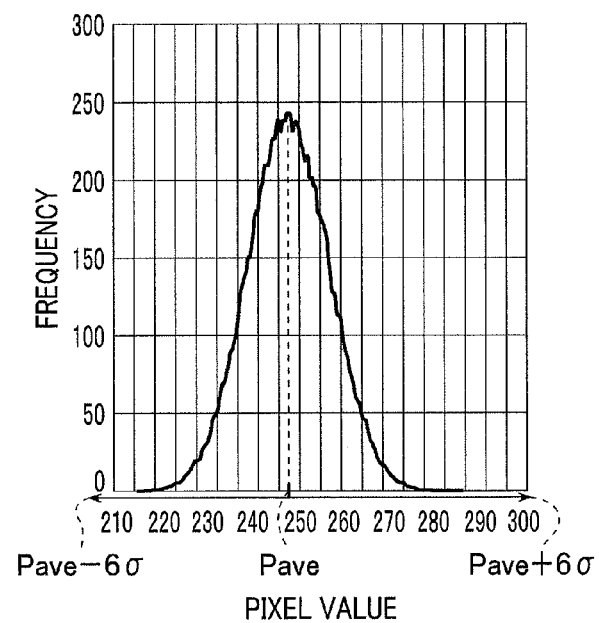
FIG. 7 is a graph showing a range of a standard deviation σ at the time when k=6 as an example of a histogram of an appearance frequency attributable to fluctuation of a pixel value due to dark random noise among a plurality of frames of a pixel value in a certain pixel i in the first embodiment.

More specifically, the dark-random-noise-tendency determining section 32a calculates the standard deviation σd indicating a degree of variation attributable to dark random noise among a plurality of frames of a pixel value (a so-called OB component) of certain one pixel in the OB section 22. FIG. 7 shows an example of a histogram of an appearance frequency of respective pixel values of the OB section 22 attributable to fluctuation in a pixel value due to the dark random noise among the plurality of frames. However, a dark current level is different for each of pixels and a dark current contributes to the dark random noise as dark shot noise. Therefore, more accurately, the standard deviation σd takes a value slightly different for each of the pixels. Therefore, it is desirable to calculate the standard deviation σd in a plurality of pixels in the same manner and average a calculated plurality of standard deviations σd to reduce influence of variation of the dark current.

Note that, for example, the dark-random-noise-tendency determining section 32a calculates, in the plurality of pixels of the OB section 22, the standard deviation σd indicating a degree of variation attributable to the dark random noise among the plurality of frames and averages the calculated plurality of standard deviations σd to calculate the final standard deviation σd. However, the processing is not limited to this.

For example, the comparison light composition section 31 may perform the comparison light composition processing for a desired number of frames on a pixel value read out from the OB section 22 and calculates an average of respective pixel values of an appropriate area (an area formed by a plurality of pixels) of the OB section 22 after the comparison light composition processing to directly calculate an OB correction level Cob[i] for the desired number of frames. This method is a method of directly calculating a graph shown in FIG. 11.

Figures 11, 12:
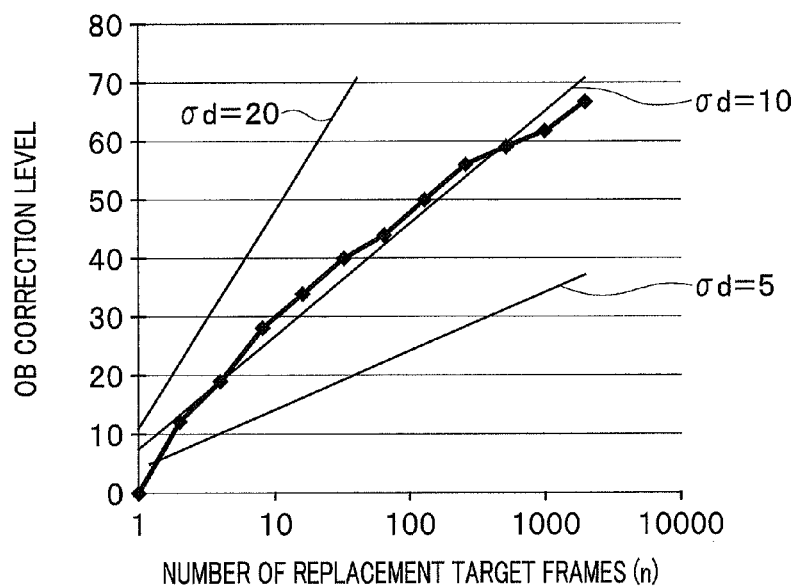
FIG. 11 is a graph showing, with a standard deviation σd of a pixel value in a certain pixel i of the OB section set as a parameter, an OB correction level corresponding to the number of replacement target frames in the first embodiment.
FIG. 12 is a table showing a specific example of a conversion coefficient into a quantification unit of one electron corresponding to a set value of a gain in the first embodiment.

That is, as shown in FIG. 11, the OB correction level Cob[i] shows a tendency of being proportional to a logarithm of the desired number of frames (the number of replacement target frames). Therefore, if the OB correction level Cob[i] with respect to the number of replacement target frames having a relatively large value is acquired in at least two different numbers of replacement target frames, it is possible to obtain an approximation straight line necessary for calculating the OB correction level Cob[i] with respect to the desired number of replacement target frames.

For this purpose, the comparison light composition processing for at least two different desired numbers of frames (the numbers of replacement target frames) only has to be performed on a pixel value read out from an appropriate area of the OB section 22. Consequently, it is possible to calculate an optimum OB correction level Cob[i] corresponding to the number of replacement target frames for each of the pixels i.

Note that, in this method, in calculating the OB correction level Cob[i], it is unnecessary to calculate the standard deviation d in advance. However, the standard deviation σd is necessary when processing in the following step S3 is performed. Therefore, for example, making use of the fact that a gradient of the straight line shown in FIG. 11 is different for each of the standard deviations σd, the standard deviation σd may be back-calculated on the basis of a gradient of the approximation straight line used for calculating the OB correction level Cob[i].

That is, the straight line shown in FIG. 11 is stored in advance in a not-shown storing section of the image processing section 3 as explained below. The standard deviation σd can be calculated by comparing gradients of respective straight lines stored in the storing section (a gradient of a straight line of σd=5, a gradient of a straight line of σd=10, and a gradient of a straight line σd=20) and a gradient of an approximation straight line actually calculated from a comparison light composition processing result.

As an example of very rough values, when the gradient of the straight line of σd=5 in the graph shown in FIG. 11 is 0.5, the gradient of the straight line of σd=10 is 1.0, and the gradient of the approximation straight line actually calculated from the comparison light composition processing result is 0.75, the standard deviation rd is set to 7.5.

The standard deviation σd calculated by the dark-random-noise-tendency determining section 32a is transmitted to the number-of-replacement-target-frames calculating section 31a of the comparison light composition section 31. Then, the number-of-replacement-target-frames calculating section 31a calculates the number of replacement target frames n[i] using the received standard deviation σd (step S3).

Note that, in FIG. 5, an example is shown in which the determination of the dark random noise tendency in step S2 and the calculation of the number of replacement target frames n[i] by the number-of-replacement-target-frames calculating section 31a in step S3 are performed after the comparison light composition processing in step S1. However, the processing is not limited to this. For example, the determination and the calculation may be performed in the comparison light composition processing.

Figure 6:
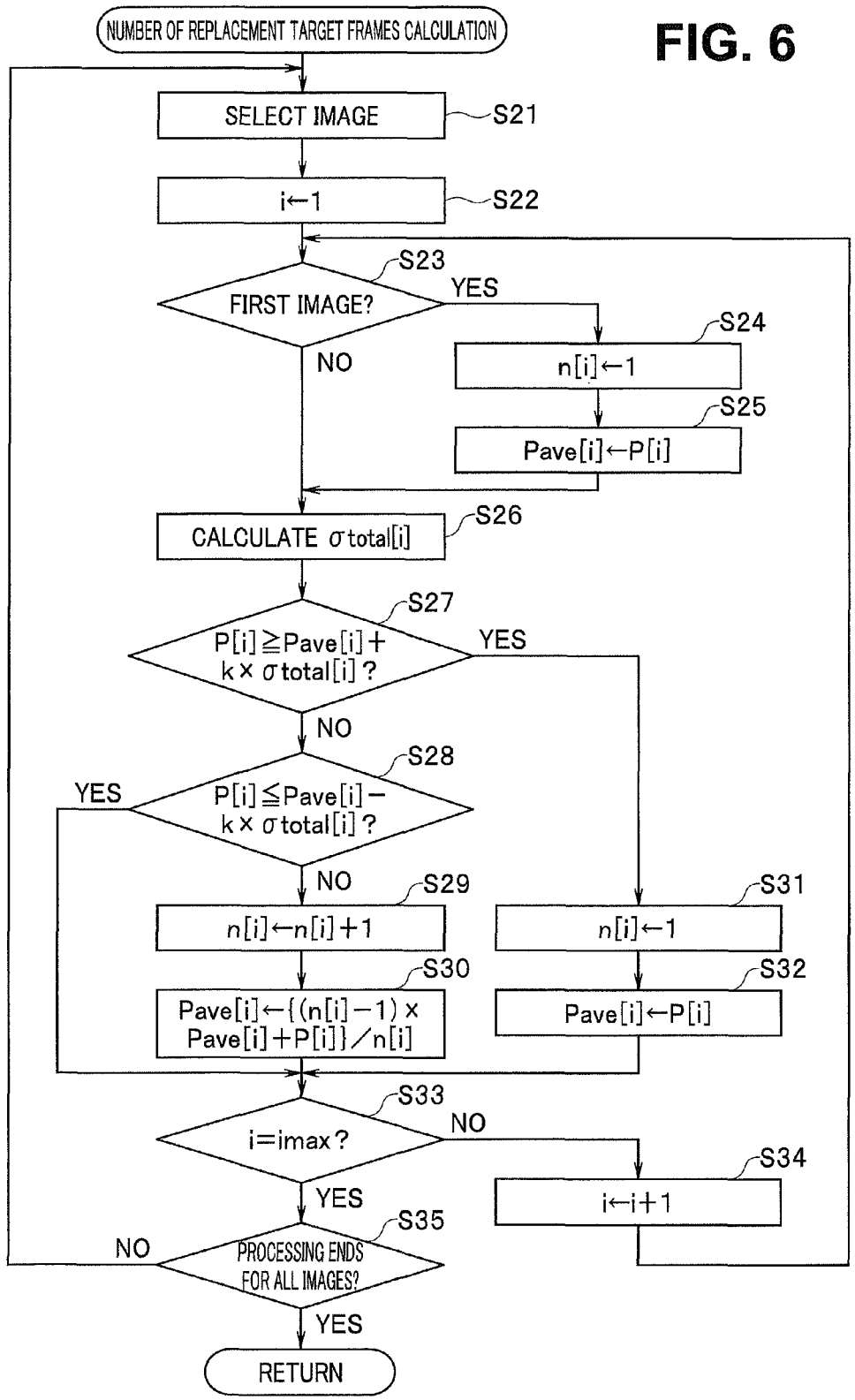
FIG. 6 is a flowchart showing processing of number-of-replacement-target-frames calculation in step S3 of FIG. 5 in the first embodiment.

FIG. 6 is a flowchart showing the processing of the number of replacement target frames calculation in step S3 in FIG. 5.

When the processing is started, an image of one frame is selected out of the images of the N frames according to appropriate order (e.g., according to photographing order) (step S21).

The number-of-replacement-target-frames calculating section 31a substitutes 1 in the index i for distinguishing pixels according to pixel positions and initializes the index i (step S22).

Subsequently, the number-of-replacement-target-frames calculating section 31a determines whether an image currently being processed is an image selected first out of the images of the N frames, that is, a first image (step S23).

When determining that the image currently being processed is the first image, the number-of-replacement-target-frames calculating section 31a sets 1 in the number of replacement target frames n[i] (step S24) and sets P[i] in Pave[i] indicating an average pixel value of the pixel i (step S25).

When determining in step S23 that the image currently being processed is not the first image or when performing the processing in step S25, the number-of-replacement-target-frames calculating section 31a calculates a random noise amount σtotal[i] indicating influence of random noise included in a pixel value of the pixel i (step S26).

The random noise is roughly classified into the dark random noise and the light random noise as explained above. The random noise amount σtotal[i] of the pixel i is represented as follows as a square root of an added-up value of a square of the standard deviation σd indicating a dark random noise amount and a square of a light noise amount σb[i]

$$\sigma total[i]=(\sigma d^{\wedge}2+\sigma b[i]^{\wedge}2)^{\wedge}0.5$$

A sign [^] represents a power.

The dark random noise amount is an amount, a value of which changes depending on an exposure time, temperature of the image pickup device 2 during photographing, and the like. As explained above, the dark random noise amount is calculated as the standard deviation σd indicating the degree of variation attributable to the random noise of the pixel value of the OB section 22 (that is, not depending on a signal generated by photoelectrically converting incident light from the object and not depending on a true pixel value of the pixel i).

The magnitude of the light random noise amount σb[i] is different according to a type of the image pickup device 2 (or a characteristic of the image pickup device 2) and has magnitude corresponding to the true pixel value generated in the pixel i. For example, when the true pixel value is small, an amplification amount by an electric gain is set large and, when the true pixel value is large, the amplification amount by the electric gain is set small. Therefore, practically, it can be considered that the light random noise amount σb[i] depends on a photographing condition during photographing determined through exposure control of the image pickup apparatus.

More specifically, when the amplification amount by the electric gain is small (an exposure amount is large and there is little necessity of amplification), the light random noise amount σb[i] increases because a pixel value obtained by photoelectrical conversion in the respective pixels is large. When the amplification amount by the electric gain is large (when the exposure amount is small and there is necessity of amplification), the light random noise amount σb[i] decreases because the pixel value obtained by the photographic conversion in the respective pixels is small.

An approximate value of the true pixel value generated in the pixel i is obtained as the average pixel value Pave[i] related to a frame effective as a target, a pixel value of which is replaced by the comparison light composition section 31, by performing processing in step S30 explained below (an initial value of the average pixel value Pave[i] is set in step S25 or step S32).

If the number of replacement target frames n[i] is larger than 1, the average pixel value Pave[i] is an approximate value having high accuracy with respect to the true pixel value of the pixel i compared with the pixel value P[i] of the pixel i. Moreover, the average pixel value Pave[i] approaches the true pixel value at higher accuracy as the number of replacement target frames n[i] is larger.

Figure 13:
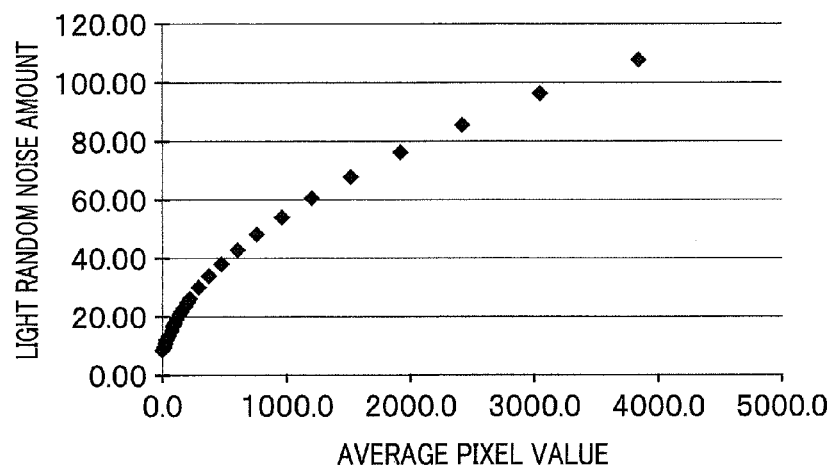
FIG. 13 is a diagram showing an example of a light random noise amount corresponding to an average pixel value in the first embodiment.

Therefore, the number-of-replacement-target-frames calculating section 31a estimates the light random noise amount σb[i] referring to FIG. 13 on the basis of the average pixel value Pave[i]. A graph shown in FIG. 13 or a calculation expression for determining a light random noise amount from an average pixel value is stored in advance in the not-shown storing section in the image pickup apparatus as explained below.

In this way, the number-of-replacement-target-frames calculating section 31a calculates, on the basis of the obtained standard deviation σd and the obtained light random noise amount σb[i], the random noise amount σtotal[i] of the pixel i according to the equation described above.

The number-of-replacement-target-frames calculating section 31a determines whether the following conditional expression is satisfied with respect to the pixel value P[i] of the pixel i in the selected image (step S27).

$$P[i] \geq Pave[i]+k \times \sigma total[i]$$

In the expression, k represents a coefficient multiplied with the random noise amount σtotal[i]. When it is determined whether a state in which the object having the average pixel value Pave[i] is located in the pixel i continues, the coefficient k determines to which degree influence of the random noise amount σtotal[i] is taken into account. The coefficient k needs to be set to a value with which a clear movement of the object can be distinguished, that is, set to a value with which a change in a pixel value involved in a movement of the object clearly different from influence of random noise can be detected. As a specific example of a numerical value, k is approximately 4 to 6.

For example, k=6 is a value set such that a probability of misrecognizing the influence of the random noise as the movement of the object is approximately 2 per billion. Since a substantial number of frames of an image photographed by a camera is sufficiently smaller than 500 million, k=6 is a value sufficiently considered such that the misrecognition due to the influence of the random noise does not occur.

On the other hand, when the value of the coefficient k is too large, even if the moving object is located in a pixel present in a certain frame or a subsequent frame, it can happen that a recognition that the moving object is located in a pixel present in a certain subsequent frame cannot be appropriately performed. In this case, regardless of the fact that a change exceeding the influence of the random noise occurs in the comparison light processing, the occurrence of the change cannot be appropriately determined. Therefore, the number of replacement target frames n[i] continues to be counted up without being reset. The number of replacement target frames n[i] of the pixel i is larger than a proper number. Consequently, in some cases, for example, the influence of the random noise is estimated large, a dark correction level is relatively large, and an OB subtraction level is too large.

Therefore, from these viewpoints, in relativity between the magnitude of the random noise and the number of comparison light photographing frames, the value of the coefficient k needs to be determined as an appropriate value that is not too small and not too large.

Further, as explained below in the present embodiment, the light random noise amount $\sigma b[i]$ is used to calculate $\sigma total[i]$ included in a determination threshold in determining the number of replacement target frames n[i]. However, the light random noise amount $\sigma b[i]$ is estimated from the average pixel value Pave[i]. The average pixel value Pave[i] changes and increases in accuracy at every moment as processing for determining the number of replacement target frames n[i] (more specifically, loop processing for calculating the average pixel value Pave[i] in step S30 explained below) is advanced. An estimated value of the light random noise amount $\sigma b[i]$ also changes and increases in accuracy according to the processing. That is, in a relatively initial stage of the loop processing, there is an estimation error of the light random noise amount $\sigma b[i]$ according to the accuracy of the average pixel value Pave[i]. Therefore, it is also necessary to take into account the value of the coefficient k such that the estimation error does not affect movement determination of the object.

FIG. 7 is a graph showing a range of the standard deviation $\sigma$ at the time when k=6 as an example of a histogram of an appearance frequency attributable to fluctuation of a pixel value due to dark random noise among a plurality of frames of a pixel value in a certain pixel i.

In FIG. 7, an example is shown in which, when the pixel value P[i] is within a range of ±6×$\sigma total[i]$ across the average pixel value Pave[i], that is, when $Pave[i]-6\times\sigma total[i]<P[i]$ $<Pave[i]+6\times\sigma total[i]$, it is determined that a state in which the object having the average pixel value Pave[i] is located in the pixel i continues. Note that one or both of the two inequality signs (<) may be changed to inequality signs with equal signs (≤) (therefore, the same applies to steps S27 and S28).

Figure 8:
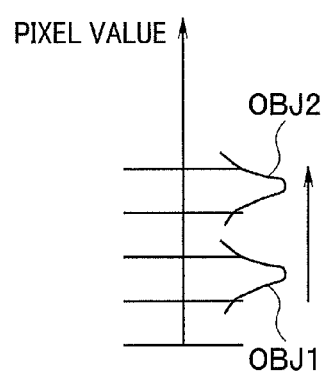
FIG. 8 is a diagram showing a state in which the histogram of the appearance frequency of the pixel value changes when an object located in a certain pixel i shifts from OBJ1 to OBJ2 in the first embodiment.

FIG. 8 is a diagram showing a state in which the histogram of the appearance frequency of the pixel value changes when an object located in a certain pixel i shifts from OBJ1 to OBJ2.

As shown in FIG. 8, when an image of an object formed in a certain pixel i changes from OBJ1 to OBJ2, which is an object clearly lighter than OBJ1, a change in a pixel value exceeding the range of Pave[i]±6×$\sigma total[i]$ occurs. Therefore, in step S27, the number-of-replacement-target-frames calculating section 31a determines whether the pixel value P[i] of the pixel i is equal to or larger than an upper limit of this range.

When determining in step S27 that the conditional expression is not satisfied, the number-of-replacement-target-frames calculating section 31a further determines, according to whether the following conditional expression is satisfied, whether the pixel value P[i] of the pixel i is equal to or smaller than a lower limit of the range (step S28).

$P[i]\leq Pave[i]-k\times\sigma total[i]$

When the conditional expression is not satisfied either, the number-of-replacement-target-frames calculating section 31a determines that the state in which the object having the average pixel value Pave[i] is located in the pixel i continues and increments the number of replacement target frames n[i] (step S29).

Further, the number-of-replacement-target-frames calculating section 31a recalculates the average pixel value Pave[i] such that the average pixel value Pave[i] becomes an average pixel value including the pixel value P[i] (step S30).

On the other hand, when determining in step S27 that the conditional expression is satisfied, since the pixel value has changed at change width exceeding the allowable change amount k×$\sigma total[i]$ that takes into account the random noise, the number-of-replacement-target-frames calculating section 31a determines that the object having the average pixel value Pave[i] has moved from the pixel i and a lighter object is located in the pixel i. The number-of-replacement-target-frames calculating section 31a resets the number of replacement target frames n[i] to 1 (step S31) and sets the average pixel value Pave[i] to P[i] again (step S32).

When performing the processing in step S30 or step S32 or determining in step S28 that the conditional expression is satisfied, the number-of-replacement-target-frames calculating section 31a determines whether i is equal to imax (step S33). Here, imax indicates the number of all pixels of the effective pixel section 21 in an image of one frame.

When there is a moving object, a target of comparison light composition is a lightest object located in the pixel i by at least one frame. Therefore, when an object, which is not the lightest object, is located in the pixel i (when it is determined in step S28 that the conditional expression is satisfied), the number of replacement target frames n[i] is neither incremented nor reset. The average pixel value Pave[i] is neither recalculated nor reset.

When determined in step S33 that i is not equal to imax, since an unprocessed pixel is present in the image selected in step S21, the number-of-replacement-target-frames calculating section 31a increments i and changes a position of a processing target pixel (step S34) and then returns to step S23 and repeatedly performs the processing explained above.

When determining in step S33 that i is equal to imax, since the processing of the image selected in step S21 has ended, subsequently, the number-of-replacement-target-frames calculating section 31a determines whether the processing concerning all the images of the N frames has ended (step S35).

When determining that the processing of all the images has not ended, the number-of-replacement-target-frames calculating section 31a shifts to step S21, selects the next image, and performs the processing explained above.

In this way, when determining in step S35 that the processing of all the images has ended, the number-of-replacement-target-frames calculating section 31a returns from the processing to the processing shown in FIG. 5.

Referring back to FIG. 5, when the number of replacement target frames n[i] has been calculated concerning all the pixels i of the comparison light image, the OB-correction-level calculating section 32 selects, on the basis of the standard deviation $\sigma d$ calculated by the dark-random-noise-tendency determining section 32a in step S2, a graph (see FIG. 11) indicating a relation between the number of replacement target frames n[i] and the OB correction level Cob[i]. The OB-correction-level calculating section 32 calculates, referring to a portion of the number of replacement target frames n[i] in the selected graph, the OB correction level Cob[i] for correcting an average <OB> of the pixel value of the OB section 22 to correspond to the pixel i (step S4).

Figure 10:
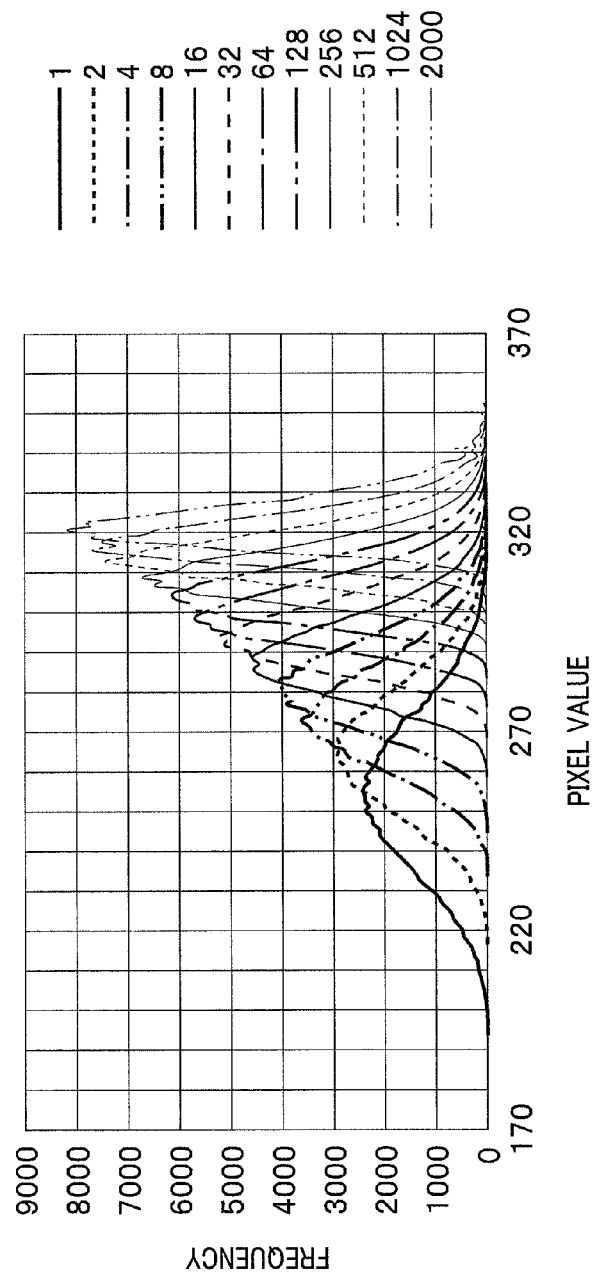
FIG. 10 is a graph showing a state in which a histogram of an appearance frequency of pixel values of a plurality of pixels in an OB section subjected to comparison light composition changes when the number of replacement target frames of a pixel changes in the comparison light composition in the first embodiment.

First, FIG. 10 is a graph showing a state in which a histogram of an appearance frequency of pixel values of a plurality of pixels in the OB section 22 subjected to the comparison light composition changes when the number of replacement target frames of a pixel changes in the comparison light composition.

Figure 9:
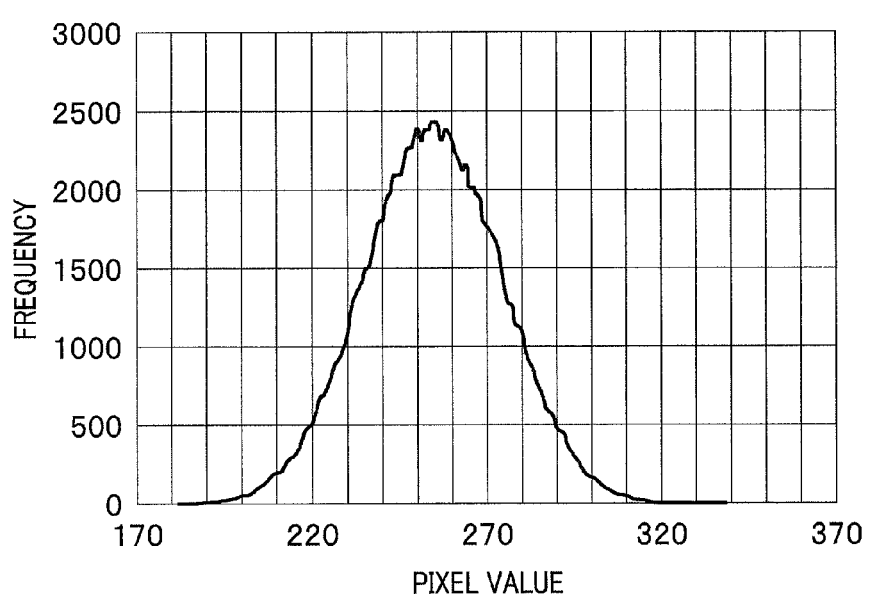
FIG. 9 is a graph showing an example of a histogram of an appearance frequency of pixel values in a plurality of pixels in an OB section of an image of one frame in the first embodiment.

A graph at the time of the number of replacement target frames n[i]=1 is the same as the graph shown in FIG. 9. However, when the number of replacement target frames n[i] increases, larger dark random noise is selected. As a result, an average pixel value of the OB image subjected to the comparison light composition shifts to a high pixel value. As a result of the selection of the larger dark random noise, as the number of replacement target frames n[i] increases, a degree of variation of the pixel value of the OB image subjected to the comparison light composition decreases.

A tendency of an increase in influence of dark random noise on comparison light composition according to the increase in the number of replacement target frames n[i] shown in FIG. 10 (a change in a peak position of the histogram in FIG. 10 is a change due to comparison light composition of an OB value due to the influence of the dark random noise) is graphed as FIG. 11. That is, FIG. 11 is a graph showing, with the standard deviation σd of a pixel value in a certain pixel i of the OB section 22 set as a parameter, the OB correction level Cob[i] corresponding to the number of replacement target frames n[i]. FIG. 11 is a semilogarithmic graph, the horizontal axis of which is a logarithm scale.

The graph (or a table, a function, or the like) shown in FIG. 11 is stored in advance in a not-shown storing section in the OB-correction-level calculating section 32 (or a not-shown storing section that can be referred to by the OB-correction-level calculating section 32 at any time) or the like.

Note that, instead of storing a graph shape shown in FIG. 11, it is also possible to store coordinates of several points on the graph, for example, coordinates of the OB correction level Cob[i] respectively corresponding to n[i]=1, 10, 100, 1000, . . . and perform interpolation to thereby calculate the OB correction level Cob[i] corresponding to the number of replacement target frames n[i].

The OB-correction-level calculating section 32 selects, according to the standard deviation σd of the pixel value of the OB section 22, a graph showing a relation between the number of replacement target frames n[i] and the OB correction level Cob[i] and calculates the OB correction level Cob[i] from the number of replacement target frames n[i] on the basis of the selected graph.

FIG. 11 shows an example of a linear graph showing a relation between the number of replacement target frames n[i] and the OB correction level Cob[i] in respective cases of σd=5, 10, and 20. The linear graph indicates that, in proportion to an exponential increase in the number of replacement target frames n[i], the OB correction level Cob[i], that is, the average pixel value in the OB section 22 shown in FIG. 10 increases. A line graph shows an example of measured values of σd=10. As shown in the figure, it is seen that the linear graph approximates to the measured values well. Note that, when the calculated standard deviation σd does not correspond to all of σd=5, 10, and 20, a graph corresponding to the standard deviation σd only has to be created by interpolating the graphs of d=5, 10, and 20.

In this way, even if the number of frames N of image data acquired from the image pickup device 2 for comparison light composition is, for example, N=100, if the number of replacement target frames n[i] in the pixel i is, for example, n[i]=50, the OB correction level Cob[i] applied to the pixel i calculated on the basis of FIG. 11 is a level lower than an OB correction level applied to a stationary object. Therefore, when a moving object is present, an OB value is corrected with an appropriate OB correction level Cob[i] corresponding to a dwell time of the moving object in the pixel i.

That is, the OB-value subtracting section 33 calculates, as a black level, the average <OB> of the pixel value of the OB section 22 in the image data of one frame in the image data of the plurality of frames acquired from the image pickup device 2. Further, the OB-value subtracting section 33 performs correction of the black level by calculating, according to, for example, OB[i]=<OB>+Cob[i], an OB value OB[i] for each of the pixels i using the OB correction level Cob[i] for each of the pixels i calculated by the OB-correction-level calculating section 32. By performing the black level subtraction processing of the pixel value using the corrected black level, correction for the black level subtraction processing by correction of deviation of the black level attributable to the dark random noise is performed.

As a specific example, an average <OB> of the pixel value in the example shown in FIG. 9 (and when the number of replacement target frames n[i]=1 in FIG. 10) is, for example, 256. FIG. 9 is a graph showing an example of a histogram of an appearance frequency of pixel values in a plurality of pixels in the OB section 22 of an image of one frame. The OB correction level Cob[i] at the time of the number of replacement target frames n[i]=100 in σd=10 in the example shown in FIG. 11 is, for example, 45. Therefore, in this case, the OB value OB[i] is calculated as 301.

On the other hand, the OB correction level Cob[i] at the time of the number of replacement target frames n[i]=10 in σd=10 in the example shown in FIG. 11 is, for example, 27. Therefore, in this case, the OB value OB[i] is calculated as 283.

Note that, in the above explanation, the average <OB> of the pixel value of the OB section 22 in the image data of one frame is corrected by the OB correction level Cob[i] to acquire the OB value OB[i] for each of the pixels i. However, the acquisition of the OB value OB[i] is not limited to this.

For example, concerning the pixel value of the OB section 22 as well, the comparison light composition section 31 sequentially performs the comparison light composition. The comparison light composition section 31 calculates, concerning n=1, 2, 3, . . . , an average <OB_comparison light (n)> of a pixel value of comparison light OB data obtained by subjecting OB data of the OB section 22 of one to n frames to the comparison light composition and creates, according to FIG. 11, a graph in which n is plotted on the horizontal axis and <OB_comparison light (n)> is plotted on the vertical axis. However, since the horizontal axis may be a logarithm scale as in FIG. 11, the comparison light composition section 31 calculates the average <OB_comparison light (n)> in at least two different ns, for example, n=1, 10, 100, . . . in advance and calculates, with interpolation, <OB_comparison light (n)> for any other n.

The comparison light composition section 31 may directly acquire, referring to the graph on the basis of the number of replacement target frames n[i], the OB value OB[i], which is a black level for each of the pixels i, as an average <OB_comparison light (n[i])>.

Thereafter, the OB-value subtracting section 33 executes the black level subtraction processing by performing, concerning all the pixels i, OB subtraction processing PeakP[i]

→PeakP[i]−OB[i] for subtracting the OB value OB[i] from a pixel value PeakP[i] of the pixel i of the comparison light image created by the comparison light composition section 31 (step S5).

Subsequently, the light-random-noise-correction-amount calculating section 34a estimates a light random noise amount σb[i] on the basis of the average pixel value Pave[i] of the pixel i in a result obtained by performing the processing concerning all the images of the N frames (step S6). The estimation is basically the same as the processing performed by the number-of-replacement-target-frames calculating section 31a in step S26 in FIG. 6. Therefore, it is also possible to omit the processing in step S6 and use the light random noise amount σb[i] finally obtained in step S26 in FIG. 6 (that is, after the processing concerning all the images of the N frames ends).

As explained above, light shot noise is random noise that occurs because the number of photons made incident on a photodiode in a pixel in one charge accumulation time (exposure time) is not always the same and has positive and negative fluctuations based on an average. Statistical magnitude (a standard deviation, etc.) of the light shot noise is proportional to a square root of the number of electrons generated according to photoelectric conversion action by the photons (the average) made incident on the photodiode.

A charge amount generated in the photodiode depends on a structure of the image pickup device 2 determined by design. Further, the exposure time (and the number of photons made incident on the photodiode) is optimally controlled according to a gain by AE control or the like. Therefore, the charge amount generated in the photodiode (and a true pixel value) depends on the gain as well. Therefore, magnitude of the light shot noise generated according to the charge amount also depends on the gain.

FIG. 12 is a table showing a specific example of a conversion coefficient into a quantification unit of one electron corresponding to a set value of a gain. In the example shown in FIG. 12, when the set value of the gain is 24 (dB), a quantization unit per one electron is 3.04.

FIG. 13 is a diagram showing an example of a light random noise amount corresponding to an average pixel value.

If the light shot noise is predominant in the light random noise, as explained above, the magnitude of the light shot noise is proportional to a square root of the number of electrons generated according to photoelectric conversion action by the photons (the average) made incident on the photodiode of the pixel (and a true pixel value obtained by photoelectrically converting photons of the number of photons of the average). The true pixel value may be approximated to the average pixel value Pave[i] as explained above. Therefore, as shown in FIG. 13, the graph showing the magnitude of the light shot noise (the light random noise amount) has a shape proportional to a square root of the average pixel value.

The graph (or a table, a function, or the like) shown in FIG. 13 is stored in advance in a not-shown storing section in the light-random-noise-correction-amount calculating section 34a (alternatively, a not-shown storing section that can be referred to by the light-random-noise-correction-amount calculating section 34a at any time) or the like.

In this way, the light-random-noise-correction-amount calculating section 34a estimates, referring to FIG. 13, concerning all the pixels i, the light random noise amount σb[i] of the pixel i on the basis of the average pixel value Pave[i] of the pixel i in the result obtained by performing the processing concerning all the images of the N frames.

The light-random-noise-correction-amount calculating section 34a further calculates σtotal[i] according to the above-mentioned equation $\sigma total[i]=(\alpha d^2+\sigma b[i]^2)^{0.5}$ using the estimated light random noise amount σb[i] and the standard deviation σd indicating the dark random noise amount. The calculation of σtotal[i] is basically the same as the processing performed by the number-of-replacement-target-frames calculating section 31a in step S26 in FIG. 6. Therefore, σtotal[i] finally obtained in step S26 in FIG. 6 (that is, after the processing concerning all the images of the N frames ends) may be used.

The light-random-noise-correction-amount calculating section 34a calculates a residual noise amount (σtotal[i]−σd) after the dark random noise subtraction and calculates, according to the calculated residual noise amount (σtotal[i]−σd), a light random noise correction amount Sft_P[i] that depends on the number of replacement target frames n[i] (step S7).

Figure 14:
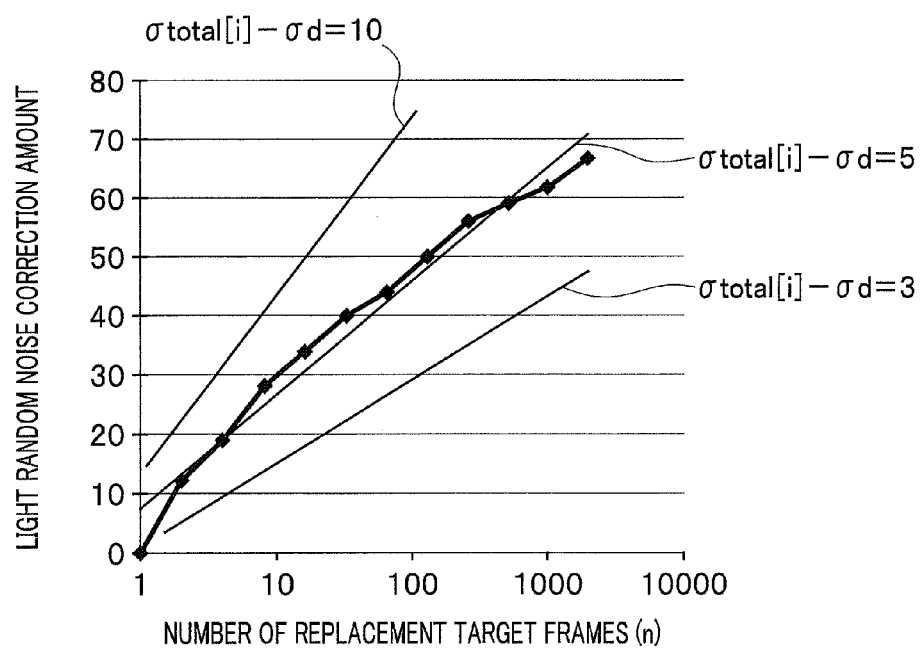
FIG. 14 is a graph showing, with a residual noise amount after dark random noise subtraction set as a parameter, a light random noise correction amount corresponding to the number of replacement target frames in the first embodiment.

As shown in FIG. 14, the light random noise correction amount Sft_P[i] increases according to the residual noise amount (σtotal[i]−σd) and increases as the number of replacement target frames n[i] increases.

FIG. 14 is a graph showing, with the residual noise amount (σtotal[i]−σd) after the dark random noise subtraction set as a parameter, the light random noise correction amount Sft_P[i] corresponding to the number of replacement target frames n[i]. Note that FIG. 14 is a semilogarithm graph in which the horizontal axis is a logarithm scale.

The graph (or a table, a function, or the like) shown in FIG. 14 is also stored in advance in a not-shown storing section in the light-random-noise-correction-amount calculating section 34a (or a not-shown storing section that can be referred to by the light-random-noise-correction-amount calculating section 34a at any time) or the like.

The light-random-noise-correction-amount calculating section 34a selects, according to the residual noise amount (σtotal[i]−σd), which is the parameter, a graph showing a relation between the number of replacement target frames n[i] and the light random noise correction amount Sft_P[i] and calculates, on the basis of the selected graph, the light random noise correction amount Sft_P[i] from the number of replacement target frames n[i].

FIG. 14 shows an example of a linear graph showing a relation between the number of replacement target frames n[i] and the light random noise correction amount Sft_P[i] in respective cases of (σtotal[i]−σd)=3, 5, and 10. The linear graph indicates that the light random noise correction amount Sft_P[i] increases in proportion to an exponential increase in the number of replacement target frames n[i]. A line graph shows an example of measured values of (σtotal[i]−σd)=5. As shown in the figure, it is seen that the linear graph approximates to the measured values well.

In this way, with the residual noise amount (σtotal[i]−σd) set as the parameter, the light random noise correction amount Sft_P[i] is calculated according to the number of replacement target frames n[i]. Therefore, when a moving object is present, appropriate light random noise correction corresponding to a dwell time of the moving object in the pixel i is performed.

Subsequently, the pixel-gain calculating section 34b calculates, for all the pixels i, a gain PG_P[i] of the pixel i using the light random noise correction amount Sft_P[i] (step S8).

First, the pixel-gain calculating section 34b sets a pixel value serving as a reference of a gain to, for example, a pixel value Ppro corresponding to proper exposure (that is, for which highest accuracy is required). Note that a reference of a gain in white balance processing is also a value near the pixel value Ppro corresponding to the proper exposure. Calculation of a white balance coefficient is desirably performed in a region excluding a moving object in an image from the view point of accuracy improvement and simplification of computation. The pixel value Ppro corresponding to the proper exposure is a value determined in advance according to a manufacturer and a product and is, for example, a value of approximately 10% of a dynamic range that the pixel value could take (if the pixel value is a pixel value digitized by 12 bits (pixel values 0 to 4095), for example, a value of approximately 410).

When a light random noise correction amount at the time when the pixel value is Ppro and the number of replacement target frames is N is described as Stf_Ppro, the pixel-gain calculating section 34$b$ calculates, for all the pixels i, the gain PG_P[i] of the pixel i as explained below.

$$PG\_P[i]=[\{(PeakP[i]-Sft\_P[i])/Ppro\}/\{(Sft\_P[i]/Sft\_Ppro)\}-1]\times Sft\_P[i]/PeakP[i]+1$$

More specifically, a gain PG_R[i] at the time when the pixel i is an R pixel, a gain PG_G[i] at the time when the pixel i is a G pixel, and a gain PG_B[i] at the time when the pixel i is a B pixel are respectively calculated as described below.

$$PG\_R[i]=[\{(PeakR[i]-Sft\_R[i])/Ppro\}/\{(Sft\_R[i]/Sft\_Ppro)\}-1]\times Sft\_R[i]/PeakR[i]+1$$
$$PG\_G[i]=[\{(PeakG[i]-Sft\_G[i])/Ppro\}/\{(Sft\_G[i]/Sft\_Ppro)\}-1]\times Sft\_G[i]/PeakG[i]+1$$
$$PG\_B[i]=[\{(PeakB[i]-Sft\_B[i])/Ppro\}/\{(Sft\_B[i]/Sft\_Ppro)\}-1]\times Sft\_B[i]/PeakB[i]+1$$

Subsequently, the pixel-gain correcting section 34 corrects, on the basis the gain PG_P[i], the pixel value PeakP[i] of the pixel i in such a manner as PeakP[i]→PeakP[i]×PG_P[i] (step S9). Consequently, coloring (color drift) attributable to the fact that the light random noise amount σb[i] is different according to the number of replacement target frames n[i] is corrected. Correction for deviation of the pixel value attributable to the light random noise is performed.

Thereafter, the standard-image processing section 35 performs standard image processing on the comparison light image (step S10) and returns from the processing to not-shown main processing.

According to the first embodiment explained above, at least one of the correction for the black level subtraction processing due to correction of deviation of a black level attributable to the dark random noise and the correction for deviation of the pixel value attributable to the light random noise is performed on the comparison light image in each partial region formed by one or more pixels. Therefore, even when a moving object is present, it is possible to obtain a comparison light image having high image quality.

The correction amounts such as the OB correction level Cob[i] and the light random noise correction amount Sft_P[i] (and the gain PG_P[i]) are determined on the basis of the number of replacement target frames n[i] for each of the pixels i in the comparison light composition processing. Therefore, it is possible to correct deviation attributable to the random noise that takes into account the fact that the influence of the random noise amount changes according to the number of replacement target frames n[i].

Further, the number of replacement target frames n[i] is calculated on the basis of the average pixel value Pave[i] and the random noise amount σtotal[i] superimposed on the average pixel value Pave[i]. Therefore, even if a plurality of objects are present in the same pixel position one after another, it is possible to accurately calculate the number of replacement target frames n[i] concerning an object remaining in the comparison light image (a lightest object present in a target pixel position).

As the random noise amount σtotal[i] in calculating the number of replacement target frames n[i], the random noise amount including both of the standard deviation σd indicating the dark random noise amount and the light random noise amount σb[i] is used. Consequently, it is possible to effectively take into account fluctuation due to the random noise of a pixel value related to the same object.

In addition, by determining a correction amount on the basis of the random noise amount, it is possible to perform appropriate random noise correction corresponding to the random noise amount.

The OB correction level Cob[i] serving as the black level correction amount is calculated on the basis of the number of replacement target frames n[i] and the standard deviation σd indicating the dark random noise amount included in the random noise amount. Correction of the black level <OB> is performed on the basis of the OB correction level Cob[i]. Consequently, it is possible to appropriately perform the black level subtraction processing.

Further, the light random noise correction amount Sft_P[i] is calculated on the basis of the number of replacement target frames n[i] and an amount obtained by subtracting the standard deviation σd indicating the dark random noise amount from the random noise amount. The gain PG_P[i] is calculated on the basis of the light random noise correction amount Sft_P[i] to perform correction for deviation of the pixel value attributable to the light random noise. Consequently, it is possible to appropriately reduce coloring and the like of the object based on the deviation of the pixel value.

The number of replacement target frames n[i] for each of the pixels i in the effective pixel section 21 is calculated. The standard deviation σd indicating the dark random noise amount is calculated on the basis of the pixel value acquired from the OB section. Therefore, it is possible to appropriately calculate the number of replacement target frames n[i] and the standard deviation σd on the basis of actually acquired image data.

Note that the sections explained above may be configured as circuits. Any circuit may be implemented as a single circuit or may be implemented as a circuit obtained by combining a plurality of circuits as long as the circuit can play the same functions. Further, any circuit is not limited to a circuit configured as an exclusive circuit for playing a target function and may be a configuration for playing the target functions by causing a general-purpose circuit to execute a processing program.

The image pickup apparatus is mainly explained above as an aspect of the present invention. However, as an aspect of the present invention, an image apparatus that perform image processing same as the processing of the image pickup apparatus may be applied. The present invention may be an image pickup method or an image processing method for performing image processing same as the processing of the image pickup apparatus or the image processing apparatus. The present invention may be a processing program for causing a computer to execute processing same as the processing of the image pickup apparatus or the image processing apparatus, a computer-readable nontransitory recording medium that records the processing program, and the like.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup apparatus comprising:
   an image pickup circuit that picks up an optical image of an object and acquires image data, the image pickup circuit including an effective pixel circuit that receives the optical image of the object and performs image pickup, and an optical black circuit in which the optical image of the object is shielded;
   a control circuit that causes the image pickup circuit to perform image pickup in time series and acquires image data of a plurality of frames;
   a comparison light composition circuit that forms a comparison light image having a plurality of partial regions formed by one or more pixels by selectively replacing a pixel value of one or more of a plurality of pixels that comprise the image data with a pixel value of a lighter pixel based on the image data of the plurality of frames; and
   a correcting circuit that:
      corrects each partial region of the comparison light image by performing a correction of deviation of a black level attributable to dark random noise and by performing a correction for deviation of a pixel value attributable to light random noise;
      calculates for each of the one or more of the plurality of pixels, a number of replacement target frames that are effective as a target for which the comparison light composition circuit replaces a pixel value;
      calculates a dark random noise amount based on a pixel value acquired from the optical black circuit;
      when performing the correction of deviation of the black level attributable to dark random noise, calculates a black level correction amount from a first parameter prepared in advance, based on the number of replacement target frames and the dark random noise amount, and corrects the deviation of the black level based on the black level correction amount; and
      when performing the correction for deviation of the pixel value attributable to light random noise, calculates a light random noise amount from pixel values of respective pixels in the replacement target frames, calculates a random noise amount based on the dark random noise amount and the light random noise amount, calculates a light random noise correction amount serving as a correction amount from a second parameter prepared in advance, based on the number of replacement target frames and an amount obtained by subtracting the dark random noise amount from the random noise amount, and corrects the deviation of the pixel value based on the light random noise correction amount.

2. The image pickup apparatus according to claim 1, wherein, the number of replacement target frames is calculated based on an average pixel value related to a particular frame effective as the target for which the comparison light composition circuit replaces the pixel value and a random noise amount superimposed on the average pixel value.

3. An image processing method comprising:
   receiving image data of a plurality of frames acquired by picking up optical images of an object in time series, the image data including pixel values of one or more of a plurality of pixels acquired by receiving the optical images of the object and performing image pickup and an optical black component acquired by shielding the optical images of the object;
   forming a comparison light image having a plurality of partial regions formed by one or more pixels by selectively replacing a pixel value of the one or more of the plurality of pixels that comprise the image data with a pixel value of a lighter pixel based on the image data of the plurality of frames;
   correcting each partial region of the comparison light image by performing a correction of deviation of a black level attributable to dark random noise and by performing a correction for deviation of a pixel value attributable to light random noise;
   calculating, for each of the one or more of the plurality of pixels that comprise the image data, a number of replacement target frames that are effective as a target for which a pixel value is replaced, when forming the comparison light image;
   calculating a dark random noise amount based on the optical black component;
   when performing the correction of deviation of the black level attributable to dark random noise, calculating a black level correction amount from a first parameter prepared in advance, based on the number of replacement target frames and the dark random noise amount, and correcting the deviation of the black level based on the black level correction amount; and
   when performing the correction for deviation of the pixel value attributable to light random noise, calculating a light random noise amount from pixel values of respective pixels in the replacement target frames, calculating a random noise amount based on the dark random noise amount and the light random noise amount, calculating a light random noise correction amount serving as a correction amount from a second parameter prepared in advance, based on the number of replacement target frames and an amount obtained by subtracting the dark random noise amount from the random noise amount, and correcting the deviation of the pixel value based on the light random noise correction amount.

4. An image pickup apparatus comprising:
   an image pickup circuit that picks up an optical image of an object and acquires image data, the image pickup circuit including an effective pixel circuit that receives the optical image of the object and performs image pickup and an optical black circuit in which the optical image of the object is shielded;
   a control circuit that causes the image pickup circuit to perform image pickup in time series and acquires image data of a plurality of frames;
   a comparison light composition circuit that forms a comparison light image having a plurality of partial regions formed by one or more pixels by selectively replacing a pixel value of one or more of a plurality of pixels that comprise the image data with a pixel value of a lighter pixel based on the image data of the plurality of frames; and
   a correcting circuit that:
      corrects each partial region of the comparison light image by performing at least one of a correction of deviation of a black level attributable to dark random noise and a correction for deviation of a pixel value attributable to light random noise;
      calculates, for each of the one or more of the plurality of pixels, a number of replacement target frames that are effective as a target for which the comparison light composition circuit replaces a pixel value;

calculates a dark random noise amount based on a pixel value acquired from the optical black circuit;

when performing the correction of deviation of the black level attributable to dark random noise, calculates a black level correction amount from a first parameter prepared in advance, based on the number of replacement target frames and the dark random noise amount, and corrects the deviation of the black level based on the black level correction amount; and when performing the correction for deviation of the pixel value attributable to light random noise, calculates a light random noise amount from pixel values of respective pixels in the replacement target frames, calculates a random noise amount based on dark random noise amount and the light random noise amount, calculates a light random noise correction amount serving as a correction amount from a second parameter prepared in advance, based on the number of replacement target frames and an amount obtained by subtracting the dark random noise amount from the random noise amount, and corrects the deviation of the pixel value based on the light random noise correction amount.

* * * * *